United States Patent [19]

Altau et al.

[11] 3,994,881
[45] Nov. 30, 1976

[54] SPANDEX PROCESS AND PRODUCT BASED ON TETRA-HALOGENATED DIISOCYANATES AND DIAMINES

[75] Inventors: Karl Altau; Roy Thomas Stiehl, Jr., both of Waynesboro, Va.

[73] Assignee: E. I. Du Pont de Nemours and Company, Wilmington, Del.

[22] Filed: July 24, 1975

[21] Appl. No.: 599,014

[52] U.S. Cl. .................. 260/75 NH; 260/75 NT; 260/77.5 AM; 260/77.5 AT; 260/77.5 SP
[51] Int. Cl.$^2$ ................ C08G 18/32; C08G 18/76
[58] Field of Search .. 260/75 NH, 75 NT, 77.5 AM, 260/77.5 AT, 77.5 SP

[56] References Cited
UNITED STATES PATENTS

| | | | |
|---|---|---|---|
| 3,365,412 | 1/1968 | Thoma et al. | 260/77.5 SP |
| 3,401,143 | 9/1968 | Finelli et al. | 260/75 NH |
| 3,415,790 | 12/1968 | Davis et al. | 260/77.5 SP |
| 3,507,834 | 4/1970 | Wittbecker | 260/75 NH |
| 3,555,115 | 1/1971 | Bottomley et al. | 260/858 |
| 3,600,358 | 8/1971 | Taub | 260/75 NH |
| 3,839,284 | 10/1974 | Mohajer | 260/77.5 SP |
| 3,870,683 | 3/1975 | Freure et al. | 260/75 NH |

*Primary Examiner*—H.S. Cockeram

[57] ABSTRACT

Segmented elastomeric polyester polyurethaneurea spandex filaments having improved resistance to degradation by ultraviolet radiation and chlorine-containing bleaches in which the hard segments contain ureylene groups joined to functionally non-aromatic radicals, at least 25 mole percent of which are

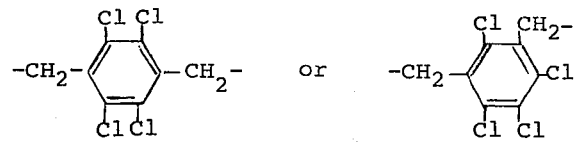

are provided as well as a process for preparing them from a polymer formed from a polyester glycol, a functionally non-aromatic diisocyanate and a functionally non-aromatic diamine. A sufficient amount of the diisocyanate and/or diamine having the structure

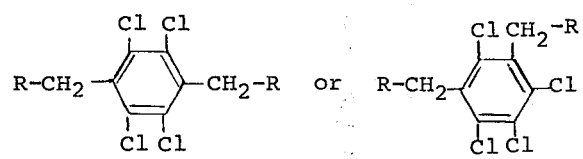

wherein R is —NCO or —NH$_2$ is reacted to provide at least 25 mole percent of the sum of the diisocyanate and diamine residues in the hard segment with the structure

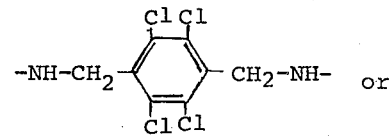

or

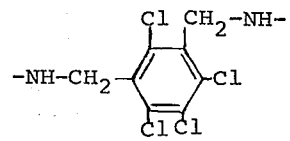

10 Claims, No Drawings

SPANDEX PROCESS AND PRODUCT BASED ON TETRA-HALOGENATED DIISOCYANATES AND DIAMINES

This invention relates to spandex filaments and yarns prepared from a polymer formed from a diamine chain extender, a diisocyanate and a polyester glycol.

It is known that commercial spandex filaments discolor in the presence of chlorine and light and that they are degraded by chlorine-containing bleaches and ultraviolet radiation. It is also known that spandex polymers prepared from diisocyanates in which the NCO groups are bound to an aliphatic moiety are more resistant to light and chlorine bleach discoloration. Nevertheless, such polymers are degraded by ultraviolet radiation and chlorine-containing bleaches with the result that their physical properties deteriorate. Additives and stabilizers used in attempts to combat degradation of the polymer by ultraviolet radiation often contribute to its degradation by chlorine bleaches.

It has now been found that enhanced resistance to degradation by chlorine-containing bleaches and by ultraviolet radiation can be achieved in spandex filaments of elastomeric polyester polyurethane-urea polymers containing hard and soft segments in which the hard segments consist of ureylene groups

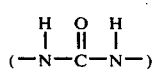

joined by functionally non-aromatic radicals; that is, each nitrogen of the ureylene group is attached to a carbon atom which is not part of an aromatic ring, and at least 25 percent of the functionally non-aromatic radicals have the key structure

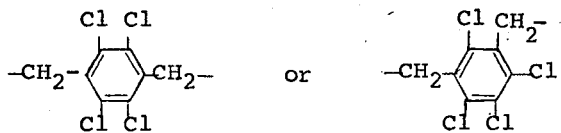

or mixtures thereof.

The advantages of this invention are particularly attainable when the key structure comprises at least 40%, preferably at least 50 mole percent of the nonureylene portion of the hard segment of the spandex polymer, and best results are achieved when the non-ureylene portion of the hard segment contains 100 mole percent of the key structure. Resistance to degradation increases as the concentration of the key structure in the polymer increases.

In the preparation of such spandex filaments by spinning a polymer prepared from a polyester glycol, a diisocyanate and a diamine in which the diisocyanate and diamine each have aliphatically or cycloaliphatically bound functional groups, the improvement of this invention comprises reacting a diisocyanate and/or a diamine having the structure

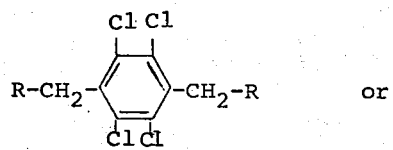

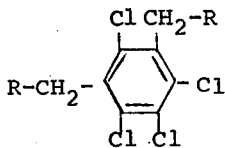

wherein R is —NCO or —NH₂ in such quantities that at least 25 mole percent of the sum of the diisocyanate and the diamine residues in the hard segment have the structure

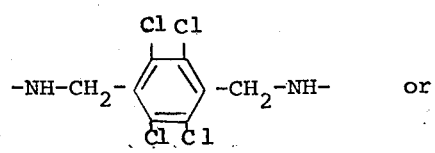

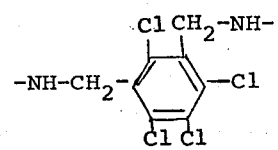

of mixtures thereof.

The hard segment comprises recurring units having the formula

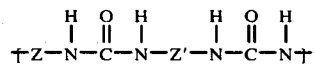

where Z is contributed by the diisocyanate and Z' is contributed by the diamine. Although some of the diisocyanate becomes part of the soft segment, all of the chain extender used remains in the hard segment together with a stoichiometrically equivalent amount of diisocyanate.

It is to be understood that the hard segment can contain mixtures of the key structures of this invention and that such mixtures can be obtained by using mixtures of tetrachloro -(meta and para)- xylylenediamine (TClMXD or TClPXD) or mixtures of tetrachloro -(meta and para)- xylylene diisocyanate (TClMXDI or TClPXDI) or mixtures of such mixtures. Tetrachloro-meta-xylylene diisocyanate can also be used with tetrachloro-para-zylylenediamine or the para diisocyanate isomer can be used with the metal diamine isomer.

The results achieved by the practice of this invention are particularly surprising in view of the disclosure in U.S. Pat. No. 3,600,358 issued on Aug. 17, 1971 to Taub. This reference states that polyurethane-urea elastomeric compositions which are prepared from chlorine-containing diamine chain extenders have very poor hydrolytic stability as measured by the tensile strength of the polymers. Accordingly, the polymer would be expected to degrade upon being washed, whether or not a chlorine-containing bleach is used. In fact, however, the opposite result is achieved with filaments prepared from the chlorine-containing diamines according to this invention. Indeed, whether the diamine or the diisocyanate or both contain chlorine substituents on the benzene nucleus in accordance with this invention, there is no substantial detriment to initial filament properties compared to a filament of the same polymer structure but without chlorine. In addition, the resistance of the filament to chlorine and ultraviolet degradation is enhanced. The diamines of this invention are preferred, however, since polymers prepared therefrom are more soluble and less costly than polymers prepared using the chlorinated diisocyanates described herein.

Any of the diisocyanates and diamines having aliphatically or cycloaliphatically bound functional groups which are conventionally used in the preparation of segmented polyurethane-urea filaments may be employed in conjunction with the diisocyanates and chain extenders used in this invention to produce the hard segment of the polymers used in this invention. For example any of those disclosed in U.S. Pat. No. 3,507,834 issued Apr. 21, 1970 to Wittbecker and the like may be used as well as any of those which would occur to one skilled in the art. If desired, small quantities of diisocyanates and/or diamines containing aromatically bound functional groups may also be used. However, as the number of ureylene nitrogen atoms in the hard segment attached to aromatic rings increases, the filament becomes increasingly susceptible to yellowing upon exposure to light, acid fumes, smog and chlorine-containing bleaches. For this reason, the presence of functionally aromatic radicals should be avoided completely or else limited to such small amounts as to provide a filament which does not substantially yellow on exposure to ultraviolet radiation or chlorine bleaches.

Any polyester glycol having a molecular weight of at least 600 may comprise the soft segment of the polymers used in this invention including those disclosed in U.S. Pat. No. 3,507,834 and any others which would occur to one skilled in the art. If desired, small quantities of polyether glycols having a molecular weight of at least 600 may also be used. However, since ether linkages are easily cleaved by chlorine-containing bleaches, the deleterious effect due to the presence of ether linkages in the soft segment can override the beneficial effect of the key structures of this invention. For this reason, glycols containing ether linkages should be used either not at all or else in such small quantities that the efficacy of the key structure of this invention is not substantially impaired.

Conventional techniques can be employed to prepare and spin the polymer. Such techniques are discussed, for example, in U.S. Pat. No. 3,507,834. The elastic filaments of this invention are composed of segmented polymers which have a substantially linear polymeric structure but which can be cross-linked to some extent. The term "substantially linear" is not intended to exclude polymers which have branches extending out from the main polymer chain. Cross-linked products may be obtaned by using reactants with a functionality of more than two, but this is generally less satisfactory since an excessive degree of cross-linking interferes with the shaping of the filaments. Cross-linked filaments may be prepared directly by the process of chemical spinning using reactants having a functionality of more than two. Alternatively, the substantially linear filaments may be cross-linked by conventional methods after shaping, such as by heating with an excess of organic diisocyanate. Typical reactants that may, for example, be used to provide some degree of cross-linking include diethylenetriamine, trimethylolpropane and glycerine.

The chlorine bleach and ultraviolet radiation resistant spandex filaments of this invention may be used in any application for which spandex fibers are known to be suitable.

Test Procedures

Filament properties can be approximated from the properties of films. The films for testing are prepared by coating a thin layer of polymer solution on a poly-(ethylene terephthalate) film base, drying for 16 hours in an air oven at about 70° C, cutting the dried film into thin strips and removing it from the base film. For the sake of convenience, some of the examples report properties determined on such films rather than on filaments.

The terms $P_{100}$ and $P_{200}$ refer to the fifth cycle unload values of stress ("power") corrected for denier at the percent elongations indicated by the respective subscripts. The value for these terms and the elongation and tenacity is determined as outlined in U.S. Pat. No. 3,507,834, except that the rate of elongation is 1000% per minute.

Stress decay is the loss in stress in a filament 30 seconds after it has been elongated to 300% on the fifth cycle of the $P_{100}$ measurement, expressed as a percentage of the maximum stress measured at 300% elongation.

Smog exposure is for 16 hours by the procedure described in U.S. Pat. No. 3,507,834. Chlorine bleach discoloration is determined as described in U.S. Pat. No. 3,507,834 for Chlorine Discoloration using a Model V Color Master differential Colorimeter and averaging the readings from each side of the sample.

Ultraviolet (UV) degradation is tested by exposure for the specified number of hours in a Model 60-W Weather-Ometer (Atlas Electric Devices Co., Chicago, Ill.). Filament samples are mounted on black cardboard and exposed 15 inches (38 cm) from a Xenon lamp. Power input is adjusted to compensate for lamp age as follows: 0–100 hours, 5500 watts; 100–500 hours, 5750 watts; an additional 250 watts power for each additional 500 hours. Temperature in the Weather-Ometer is maintained at 63° C. The $P_{100}$ stress (unload power) of the sample before and after exposure is determined. The percentage of original power retained after exposure indicates the degree of resistance to ultraviolet degradation.

Chlorine bleach degradation is tested by immersing the films or filaments for the specified number of cycles in an aqueous solution prepared by mixing 33.0 ml of commercial Clorox (contains 5.25% sodium hypochlorite or about 4% active chlorine), 2960 ml of deionized water, 6.0 g Tide (an anionic detergent) and sufficient 0.1N hydrochloric acid to give a pH of 8.0 ± .3 measured at 25° C. This solution contains 0.2% Tide and about 500 parts per million active chlorine. A cycle consists of immersion of the film or filaments, raising the temperature from room temperature to 70° C within 10 minutes, and maintaining at 70° C. for 60 minutes. The sample is then removed and rinsed well with cold water. A fresh solution is used for each subsequent cycle. After the final cycle the sample is rinsed and dried overnight in air at room temperature. The $P_{100}$ stress (unload power) of the sample before and after exposure to the chlorine solution is determined. The percentage of original power retained after exposure indicates the degree of resistance to chlorine bleach degradation.

Hot-wet creep is tested by measuring an original length ($L_0$) of a film of filament, stretching it to three times its original length in a frame, and immersing it in its stretched condition for 60 minutes in a water bath at 97°–100° C. The frame is then removed from the bath, the tension is released, and the sample is allowed to relax at room temperature for 3o minutes before measuring the final length (L). The percent hot-wet creep is calculated from the following formula:

$$\% \text{ hot-wet creep} = \frac{L - L_0}{2 \times L_0} \times 100$$

Zero strength temperature is determined by placing a film sample about 3 mm (⅛ inch) wide across the clean, flat upper surface of an electrically heated metal block about 5 cm (2 inches) in diameter and across two adjacent metal rods, each about 6 mm (¼ inch) in diameter, so that the ends of the film hang over the rods on each side of the block. Each rod is located about 2.5 cm (1 inch) from the edge of the block and at the same height as the upper surface thereof. To each end of the film is attached a 5 g weight. A 500 g cylindrical brass weight (4.0 cm diameter) is placed upright on the film to ensure good contact with the block. The zero strength temperature of the film is the temperature at which it breaks when the block is heated from room temperature at a uniform rate (3°–5° C per minute). The same procedure is used for measuring zero strength temperature of filaments except that a 1g weight is attached to each end of the filament.

The invention is further illustrated but is not intended to be limited by the following examples in which all parts and percentages are by weight unless otherwise indicated.

EXAMPLE I

A mixture of 240 g of a copolyester of adipic acid and ethylene glycol/tetramethylene glycol (61/39 molar ratio) having a molecular weight of 3400 determined by end-group analysis and 1260 g of the same copolyester having a molecular weight of about 1650 determined by end-group analysis is well blended to yield a copolyester having a calculated molecular weight of about 1800.

To 540 g (0.3 mole) of the 1800 molecular weight copolyester is added 126 g (0.48 mole) of 4,4'-methylene-dicyclohexyl diisocyanate containing 20% of the trans-trans isomer. The mixture is heated with stirring under nitrogen atmosphere in the presence of dibutyltin dilaurate catalyst (about 0.02%) for 1.5 hours at 70° C to yield an isocyanate-terminated polyester which contains 2.03% NCO. A solution is formed by dissolving 150 g of the isocyanate-terminated polyester in 279 g of dry N,N-dimethylacetamide. To this solution is added with stirring at ambient temperature (25° C) under nitrogen atmosphere 188 ml of a tetrachloro-p-xylylenediamine solution as the chain extender. This solution is obtained by dissolving 5.48 g of tetrachloro-p-xylylenediamine (having a melting point of 134°–136° C) in sufficient dimethylacetamide to make 100 ml (0.2 molar). To increase solution viscosity, 45.5 g of the isocyanate-terminated polyester and 63 ml of the tetrachloro-p-xylylenediamine solution are added in increments to reach a Bromphenol Blue indicator end point. The inherent viscosity of the spandex polymer so produced is 0.78, as measured at 0.5% concentration in dimethylacetamide at 25° C.

The spandex polymer solution is heated to 44° C and is spun from a five-hole spinneret in a dry-spinning cell heated to 225° C. The filaments are coalesced by means of an air-jet twister in the usual way and wound up at 231 m per minute. The filaments possess the following physical properties: denier 87; tenacity, 0.52 gram per denier (gpd); elongation, 618%; $P_{100}$, 0.023 gpd; $P_{200}$, 0.055 gpd; stress decay, 21.3%; zero strength temperature, 177° C; hot-wet creep, 56%.

The filaments show unusually good resistance to degradation on exposure to chlorine bleach and ultraviolet light, as indicated by the following data:

|  | $P_{100}$ Values | | |
|---|---|---|---|
|  | Pre Exposure | After Exposure | Percent Retained |
| Chlorine Bleach (3 cyc) Degradation | 0.023 | 0.020 | 87 |
| Ultraviolet Degradation (80 hrs) | 0.023 | 0.007 | 30 |

The filaments show good whiteness retention on exposure to smog and chlorine bleach, as indicated by the following data:

|  | "b" Values | | |
|---|---|---|---|
|  | Pre Exposure | After Exposure | Δ b |
| Smog Discoloration (16 hrs) | 0.3 | 3.8 | 3.5 |
| Chlorine Bleach Discoloration (10 cyc) | 1.0 | 3.7 | 2.7 |

EXAMPLE II

Following the procedures outlined in Example I the chain extenders given in the following table are used at mole ratios of 1800 molecular weight copolyester: diisocyanate: chain extender of 1:1.6:.6 for runs 1 – 3 and the same copolyester of Example I but having a molecular weight of 3160 at mole ratios of 1:1.75:.75 for Runs 4 – 5. Run 1, in which para-xylylenediamine (PXD) is used, is a control. As Tables IA and IB show, the filaments have improved stability to UV and to chlorine bleach degradation without significant sacrifice of other properties. Stability against chlorine bleach degradation is shown even after repeated exposure cycles.

As the data for Runs 2 and 3 indicate, best results are obtained when the chlorine-containing diamines are used as the only chain extenders.

TABLE I-A

| Run | Chain Extender | Inherent Viscosity | Denier | Hot-Wet Creep % | Zero Strength Temperature (°C) | Before Exposure $P_{100}$ | After Exposure Chlorine(1) Bleach $P_{100}$ | $P_{100}$ Retained (%) | UV Degradation(2) $P_{100}$ | $P_{100}$ Retained (%) |
|---|---|---|---|---|---|---|---|---|---|---|
| 1 | PXD | .84 | 118 | 100 | 119 | .020 | 0(3) | 0 | 0 | 0 |

TABLE I-A-continued

| Run | Chain Extender | Inherent Viscosity | Denier | Hot-Wet Creep % | Zero Strength Temperature (°C) | Before Exposure $P_{100}$ | After Exposure Chlorine(1) Bleach $P_{100}$ | $P_{100}$ Retained (%) | UV Degradation(2) $P_{100}$ | $P_{100}$ Retained (%) |
|---|---|---|---|---|---|---|---|---|---|---|
| 2 | TClPXD/(80/20 mole %) ethylenediamine | .72 | 91 | 63 | 176 | .025 | .017 | 68 | .008 | 32 |
| 3 | TClPXD | .78 | 87 | 56 | 177 | .023 | .020 | 87 | .011 | 48 |
| 4 | TClMXD | .92 | 109 | | 164 | .018 | .007 | 39 | .006 | 33 |
| 5 | TClPXD | .81 | 67 | | 173 | .017 | .008 | 47 | .008 | 47 |

(1) After three cycles of the chlorine bleach degradation test
(2) After 40 hours exposure
(3) Disintegrated after two cycles

TABLE I-B

| Run | Stress Decay (%) (1) | (2) | Tenacity (g/den) (1) | (2) | Break Elongation (%) (1) | (2) |
|---|---|---|---|---|---|---|
| 1 | 18.6 | (3) | .33 | (3) | 738 | (3) |
| 2 | 18.8 | 19.6 | .47 | .22 | 621 | 687 |
| 3 | 21.3 | 20.2 | .52 | .30 | 618 | 645 |
| 4 | 19.0 | 17.7 | .51 | .12 | 766 | 763 |
| 5 | 16.0 | 10.6 | .34 | | 756 | |

(1) Initial filament property
(2) After 3 cycles of the chlorine bleach degradation test.
(3) Disintegrated after two cycles.

EXAMPLE III

The general procedure of Example I is followed with the following modifications. Seventy-two grams (72 g) of 1800 molecular weight copolyester glycol, 21.9 g of tetrachloro-p-xylylene diisocyanate (1:1.7 molar ratio) and 47 g of dry dimethylacetamide are mixed under a nitrogen atmosphere at 62° C to obtain a homogeneous mixture. Dibutyltin dilaurate catalyst (0.02%) is added to the mixture and the reaction carried out for 1 hour at 70° C (NCO of capped glycol solution = 1.63%).

Thirty-six grams (36 g) of the isocyanate-terminated glycol solution, 169 g of dimethylacetamide and 27.0 ml of 0.2 molar tetrachloro-p-xylylenediamine in dimethylacetamide are combined in a high shear mixer to prepare a solution of spandex polymer (at about 100° C). Spandex filaments are wet spun into warm water from a 4.5% solids solution in dimethylacetamide.

Film having a thickness of about 4 mils (0.1 mm) after drying is also cast from a hot (100° C) 12% solids solution of the polymer in dimethylacetamide. The $P_{100}$ (%) retained after 3 cycles of the chlorine bleach degradation test for the fiber is 90 and for the film is greater than 80.

A commercial spandex filament is prepared from a commercial polymer without stabilizers. The polymer is made from the same copolyester having a molecular weight of 3400, 4,4'-methylene diphenyl diisocyanate and ethylenediamine. No $P_{100}$(%) was retained for this filament after 3 cycles of the chlorine bleach degradation test.

EXAMPLE IV

The procedures of Example I are followed except that varying ratios of TClPXD and ethylenediamine are used as outlined in Table II and the polymer is cast from a 20% solids solution in dimethylacetamide to a film having a dry thickness of about 6 mils (0.15 mm). The properties of the film after 0, 2, 3 and 4 cycles of the chlorine bleach degradation test are given in Table II.

The ratios given in the TAble, when divided by two, indicate the mole percent of each amine component in the hard segment. As the results set out in Table II indicate, when the hard segment of the polymer contains only 20 mole percent of TClPXD, the properties of the film are not satisfactory.

TABLE II

CHLORINE BLEACH DEGRADATION RESISTANCE OF SPANDEX FILMS

| TClPXD/ (Mole %) Ethylenediamine | 100/0 | | | | 80/20 | | | | 61/39 | | | | 41/59 | | | |
|---|---|---|---|---|---|---|---|---|---|---|---|---|---|---|---|---|
| Inherent Viscosity | 1.26 | | | | .89 | | | | 1.34 | | | | 1.34 | | | |
| BLEACH CYCLES | 0 | 2 | 3 | 4 | 0 | 2 | 3 | 4 | 0 | 2 | 3 | 4 | 0 | 2 | 3 | 4 |
| Properties | | | | | | | | | | | | | | | | |
| $P_{100}$ | .025 | .018 | .015 | .010 | .025 | .016 | .012 | .008 | .026 | .010 | .008 | .006 | .021 | .003 | .002 | (1) |
| $P_{200}$ | .051 | .035 | .031 | .025 | .050 | .033 | .024 | .023 | .048 | .025 | .021 | .018 | .043 | .013 | .009 | .005 |
| Tenacity g/den | .49 | .30 | .22 | .15 | .44 | .21 | .11 | .10 | .36 | .15 | .10 | .09 | .42 | .07 | .12 | (1) |
| Break Elongation | 743 | 809 | 821 | 808 | 696 | 747 | 714 | 735 | 645 | 922 | 728 | 785 | 680 | 761 | 822 | (1) |
| % $P_{100}$ Retained | | 72 | 60 | 40 | | 64 | 48 | 32 | | 38 | 31 | 23 | | 14 | 10 | (1) |

(1) Disintegrated

EXAMPLE V

The general procedure of Example III is followed in reacting 54.0 g of the copolyester glycol having a molecular weight of 1800 and 15.1 g of tetrachloro-p-xylylene diisocyanate (TClPXDI) in 34.6 g of dimethylacetamide (1.5 molar ratio of diisocyanate: copolyester glycol). Chain extension is carried out using 45.0 g of this solution of isocyanate-terminated polyester, 55.0 g additional of dimethylacetamide, and 5.7 ml of p-xylylenediamine solution (1 molar) in dimethylacetamide, using the procedure of Example I. A film having a thickness of about 6 mils (0.15 mm) after drying is cast from the polymer solution. A comparative film made from the same copolyester glycol and diamine but substituting p-xylylene diisocyanate (PXDI) for the tetrachloro-p-xylylene diisocyanate is also prepared. The general procedure of Example I is used for this reaction at 1.6 molar ratio of diisocyanate: copolyester glycol. Chain extension is carried out using 30 g of isocyanate-terminated polyester dissolved in 120 g of dimethylacetamide and 6.5 ml of p-xylenediamine solution (1 molar). Table III gives the properties of the films after 0, 3 and 6 cycles of the chlorine degradation test.

TABLE III

| DIISOCYANATE | PXDI | | | TCIPXDI | | |
|---|---|---|---|---|---|---|
| BLEACH CYCLES | 0 | 3 | 6 | 0 | 3 | 6 |
| $P_{100}$(gpd) | .023 | .003 | 0 | .010 | .003 | .002 |
| Stress Decay (%) | 20.0 | 20.2 | | 21.5 | 20.1 | 24.4 |
| Tenacity (gpd) | .28 | .025 | 0 | .12 | .024 | .021 |
| Elongation (%) | 684 | 418 | 0 | 689 | 417 | 425 |
| Inherent Viscosity | 1.79 | | | .53 | | |
| % $P_{100}$ Retained | | 13 | 0 | | 30 | 20 |

It is to be understood that the foregoing examples are for the purpose of illustration and that any other polyester glycol, diisocyanate and diamine as specified herein when substituted for its counterpart can be expected to provide similar results. Although the invention has been described in considerable detail in the foregoing, such detail is solely for the purpose of illustration and variations can be made by those skilled in the art without departing from the spirit and scope of the invention.

What is claimed is:
1. A filament having improved resistance to degradation by ultraviolet radiation and chlorine-containing bleaches and consisting essentially of an elastomeric polyester polyurethane-urea polymer having hard and soft segments in which the hard segments consist essentially of ureylene groups joined by functionally non-aromatic radicals, at least 25 mole percent of which is a chlorinated radical having the formula

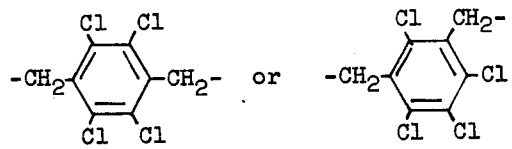

or mixtures thereof.

2. The filament of claim 1 in which the chlorinated radical comprises at least 40 mole percent of said non-aromatic radicals in the hard segments.

3. The filament of claim 1 in which the chlorinated radical comprises 100 mole percent of the nonaromatic radicals in the hard segments.

4. The filament of claim 1 in which at least 40 mole percent of the non-aromatic radicals are

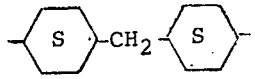

and at least 40 mole percent are the chlorinated radicals.

5. In the preparation of the segmented elastomeric polyurethane-urea-filaments of claim 1 from a polyester glycol, a diisocyanate and a diamine each of the diisocyanate and diamine having aliphatically or cycloaliphatically bound functional groups, the improvement which comprises reacting a diisocyanate, diamine or both diisocyanate and diamine having the structure

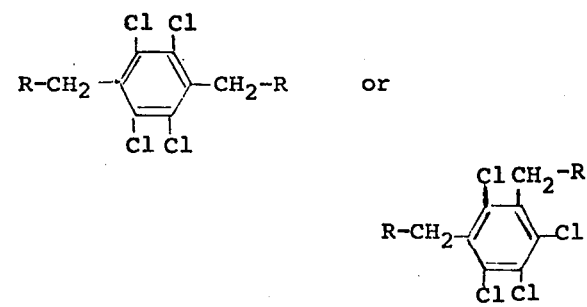

wherein R is —NCO or —NH$_2$, in such quantities that at least 25 mole percent of the sum of the diisocyanate and diamine residues in the hard segment have the structure

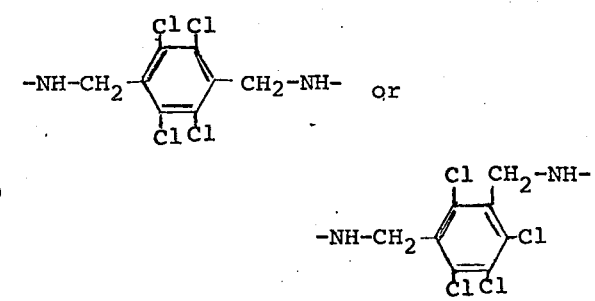

or mixtures thereof.

6. The improvement of claim 5 in which at least 50 mole percent of the sum of the diisocyanate and diamine residues in the hard segment have the structure

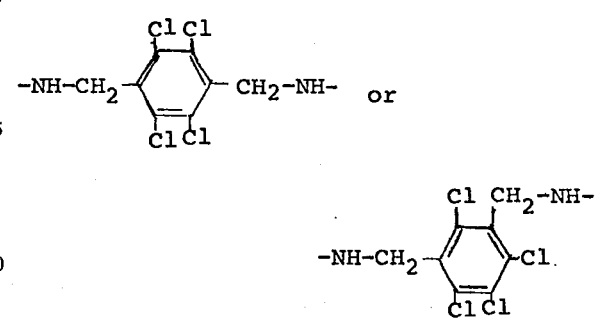

or mixtures thereof.

7. The improvement of claim 5 in which 100 mole percent of the diisocyanate and diamine residues in the hard segment have the structure

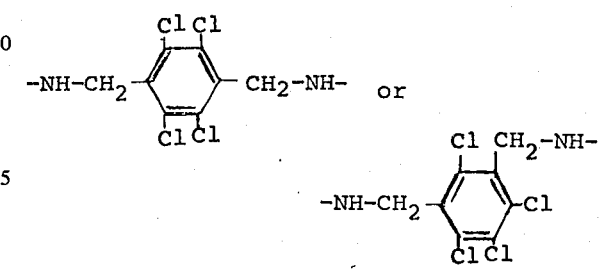

or mixtures thereof.

8. The improvement of claim 5 in which the diisocyanate is tetrachloro -(meta- or para)- xylylene diisocyanate.

9. The improvement of claim 5 in which the diamine is tetrachloro -(meta- or para)- xylylenediamine.

10. The improvement of claim 5 in which the diamine is tetrachloro-p-xylylenediamine and the diisocyanate is 4,4'-methylenedicyclohexyl diisocyanate.

* * * * *